United States Patent [19]
Carver

[11] 3,718,987
[45] March 6, 1973

[54] AIRCRAFT SOUND SIMULATION SYSTEM

[75] Inventor: Fred F. Carver, Chenango Forks, N.Y.

[73] Assignee: Singer-General Precision, Inc., Binghamton, N.Y.

[22] Filed: Sept. 10, 1970

[21] Appl. No.: 71,018

[52] U.S. Cl. .................35/12 Q, 331/78, 340/38 HE
[51] Int. Cl. .............................B64g 7/00, G09b 9/08
[58] Field of Search ...35/12 Q; 331/78, 37; 340/384, 340/384 E

[56] References Cited

UNITED STATES PATENTS

| | | | |
|---|---|---|---|
| 2,859,346 | 11/1958 | Firestone et al. | 331/37 |
| 3,462,703 | 8/1969 | Seidel | 331/37 |
| 3,483,634 | 12/1969 | Staples et al. | 340/384 E |
| 3,593,187 | 7/1971 | Dodds et al. | 331/78 |
| 3,107,438 | 10/1963 | Church et al. | 35/12 Q |
| 2,898,587 | 8/1959 | Nye | 35/12 Q X |
| 2,974,424 | 3/1961 | Roberts | 35/12 Q |

Primary Examiner—Robert W. Michell
Assistant Examiner—L. R. Oremland
Attorney—Francis L. Masselle, William Grobman and Charles S. McGuire

[57] ABSTRACT

Sound generation apparatus to simulate the sounds made by a jet engine. By adding the outputs of two nominally identical oscillators constructed using non-precision components which cause them to have slightly different output frequencies a sound closely simulating whine is obtained. Amplitude of sound is controlled by the use of field effect transistor shunts which have applied to their gates signals representing the parameters which affect the level of sound heard by a listener.

7 Claims, 5 Drawing Figures

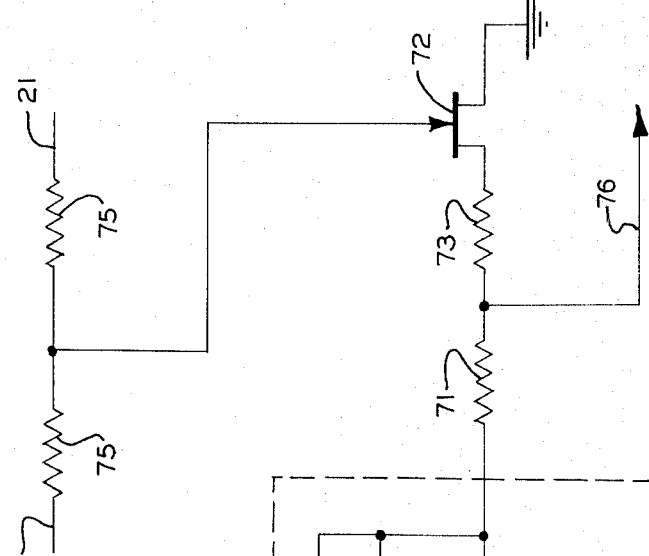
FIG. 3
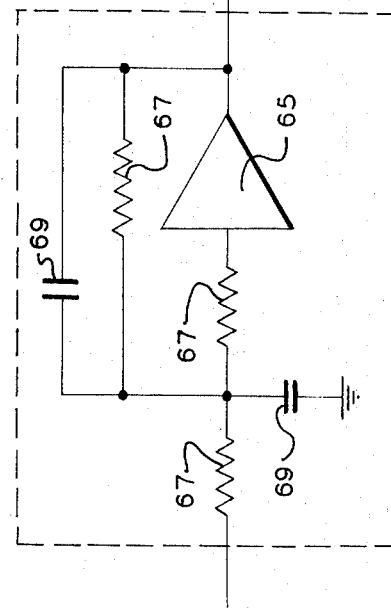
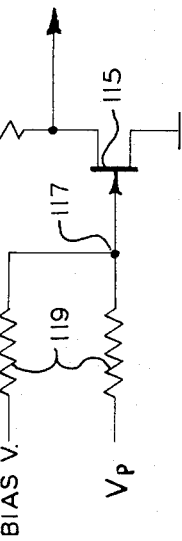
FIG. 5

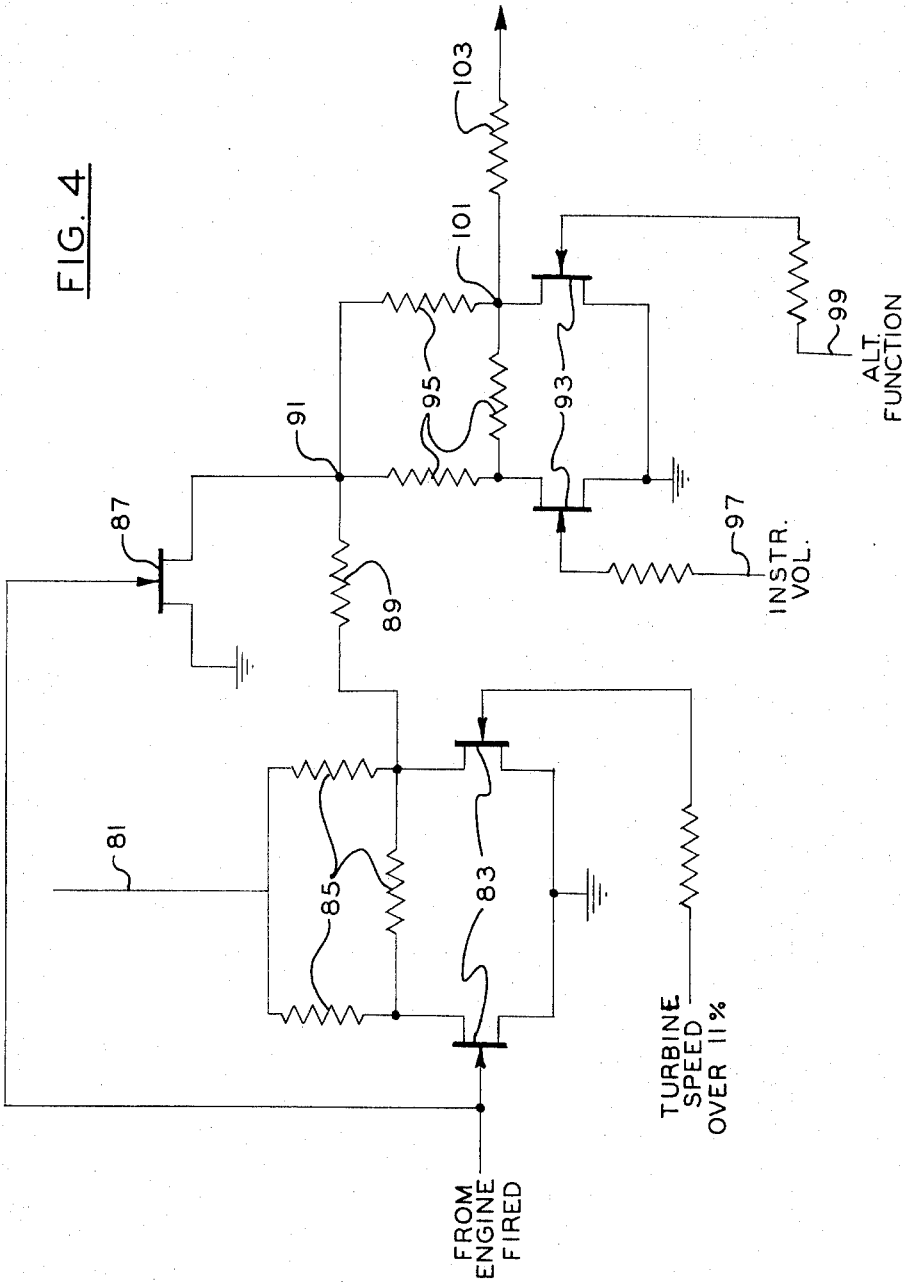

AIRCRAFT SOUND SIMULATION SYSTEM

This invention relates to electronic sound generation and more particularly to sound generating apparatus for use in jet aircraft simulators.

With the increased use of simulators for training pilots, there is an increasing demand for more realistic simulation. Typical simulators now include, in addition to a simulated cockpit and controls, motion systems, visual systems and sound systems. Each of these supply the pilot-trainee with types of cues he will experience in the actual aircraft, thereby improving the quality of simulation.

On large simulators complex sound systems have been designed and installed, some including tapes of sounds recorded in the actual aircraft. However, these complex systems would be too expensive for use in the type of small simulator now being used for general aviation training. The success of such a general aviation trainer (or simulator) depends on being able to supply a low cost simulator. Therefore a simple and effective sound system for use in a simulator of this type is necessary. A system which provides sounds for such a simulator used for piston aircraft is disclosed in U.S. Pat. No. 3,484,634 granted to L. A. Staples et al. on Dec. 16, 1969 and assigned to the same assignee as the present invention. However, due to the increase in use of small jet aircraft, simulators are now being built to train pilots in the operation of these aircraft requiring a sound system which will simulate sounds associated with jet engines. The present invention discloses a simple and effective apparatus for supplying those sounds.

It is the object of this invention to provide a sound system for use with jet aircraft simulators.

Another object is to provide such a system which is simple and effective, yet inexpensive.

An additional object is to provide simulation of jet turbine whine by a novel technique using two oscillators.

Still another object is to provide a novel means of controlling the amplitude of sounds in a simulator sound systems.

Other objects will in part appear hereinafter and in part will be obvious.

The invention accordingly comprises the features of construction, combination of elements, and arrangement of parts, which will be exemplified in the construction hereinafter set forth, and the scope of the invention will be indicated in the claims.

For a fuller understanding of the nature and objects of the invention reference should be had to the following detailed description taken in connection with the accompanying drawing in which:

FIG. 3 is a schematic diagram of an embodiment of the roar generator of FIG. 1;

FIG. 4 is a schematic diagram of an embodiment of the attenuator of FIG. 1; and

FIG. 5 is a schematic diagram of an embodiment of the air noise generator of FIG. 1.

The noises generated by a jet aircraft can be broken down into four main groups. The first noise is turbine whine, the second is engine roar, the third air noise, and the fourth, other noises such as tire squeal, stall warning, etc. The present invention is only concerned with the first three groups, although the system in which the invention is incorporated may include means for simulating sounds from the fourth group.

Turbine whine is most noticeable when the aircraft is on the ground and increased in amplitude and frequency with an increase in RPM. It is decreased when altitude increases and when the turbine is turning without being fired. Likewise, engine roar is most prevalent on the ground and, in addition to being dependent on the same functions as whine, also decreases as the mach number increases. Air noise is basically a direct function of air speed.

Figure 1:
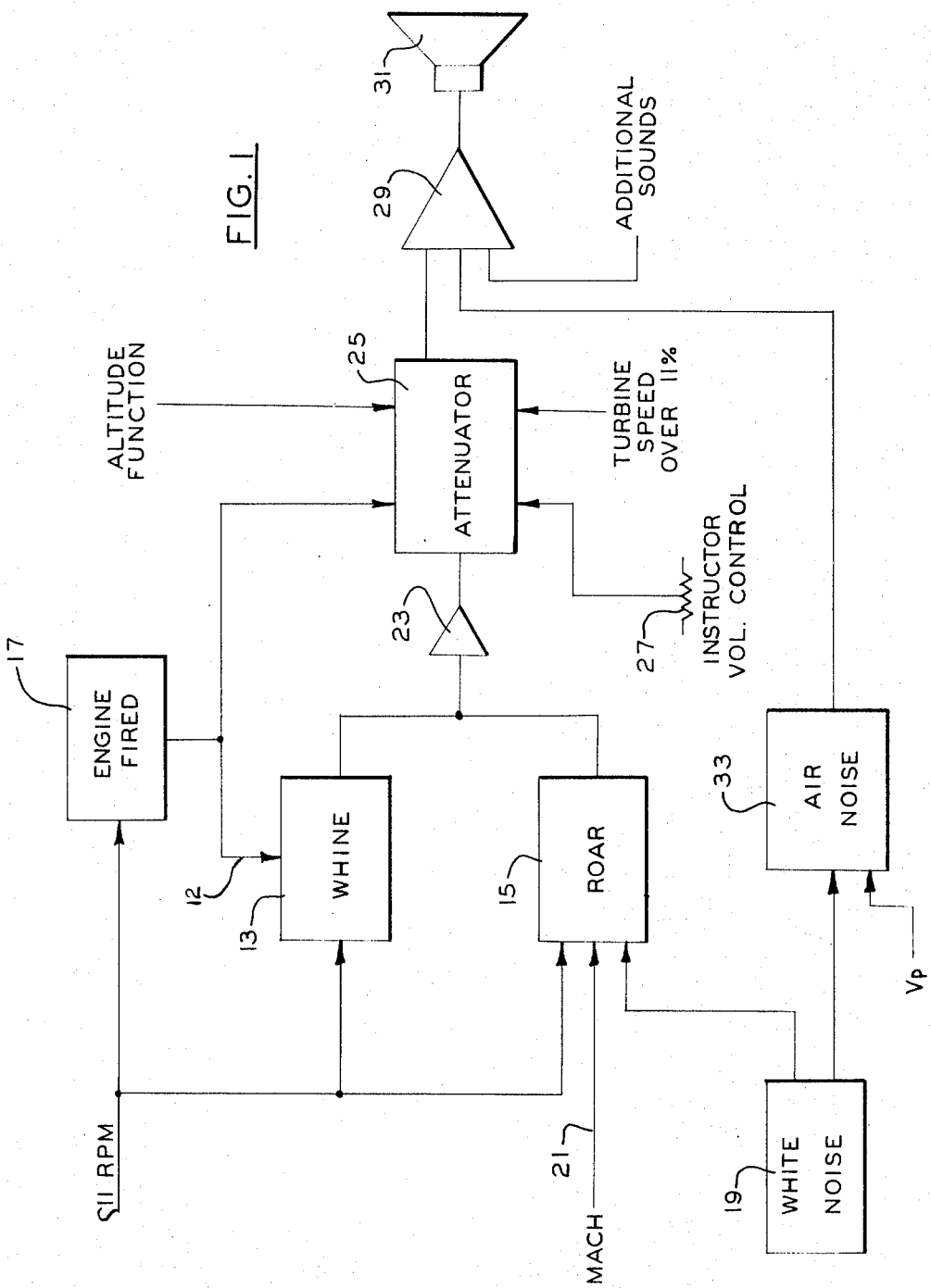
FIG. 1 is a block diagram of a preferred embodiment of the invention.

FIG. 1 shows a basic block diagram of the system. A voltage proportional to RPM is placed on input 11 which serves as an input to whine generator 13, roar generator 15, and "engine fired" circuit 17. Whine generator 13 has an additional input from the engine fired circuits since the whine noise is dependent on this function, and basically comprises, as explained in more detail later, a pair of voltage controlled oscillators. The whine generator will have an output with a frequency and amplitude proportional to the RPM. Roar generator 14, also to be described later, has inputs from white noise generator 19 and a mach input 21, in addition to the RPM input 11. White noise generator 19 may be constructed in a manner similar to that described in the above referenced Staples, et al patent. In roar generator 15 the high frequencies of the white noise are filtered out and the amplitude of the roar (the filtered noise) controlled as a function of RPM (increase of amplitude) and mach number (decrease). The mach number input 21 is a voltage proportional to mach number, obtained from the simulator computer in conventional fashion.

The two noises, whine and roar, are then summed in amplifier 23 which has an output to attenuator 25. In attenuator 25 the noise is controlled by four inputs, one from engine fired circuit 17, which will cut noise down if the engine is not fired, an altitude function from another section of the simulator computer which decreases noise as altitude increases, a turbine speed input which cuts noise when turbine speed is below a specified percentage of maximum, and an instructor control 27 which allows the instructor to adjust noise amplitude. The manner in which attenuator 25 operates will be explained later. The engine fired circuit is basically an amplifier which has a saturated DC output of a positive nature when the engine is not fired and of a negative nature when the engine is fired.

The output of attenuator 25 is summed in power amplifier 29 along with air noise and other inputs. The output of this amplifier is then conducted to speaker 31. The power amplifier and speaker may be constructed as shown in the Staples et al patent above.

Air noise is obtained from air noise generator 33 which has an input from white noise generator 19 and an Vp (velocity of the aircraft) input from the simulator computer. In the noise generator 33 the white noise is fed thru a resistor to the source of a field effect transistor which has its drain grounded. The Vp input is connected to the gate of the transistor. The output of air noise generator 33 to amplifier 29 is taken from the source of the transistor. The Vp input is scaled so that as Vp decreases a greater portion of the white noise will be conducted to ground through the transistor thus reducing the amplitude of noise reaching amplifier 29.

Figure 2:
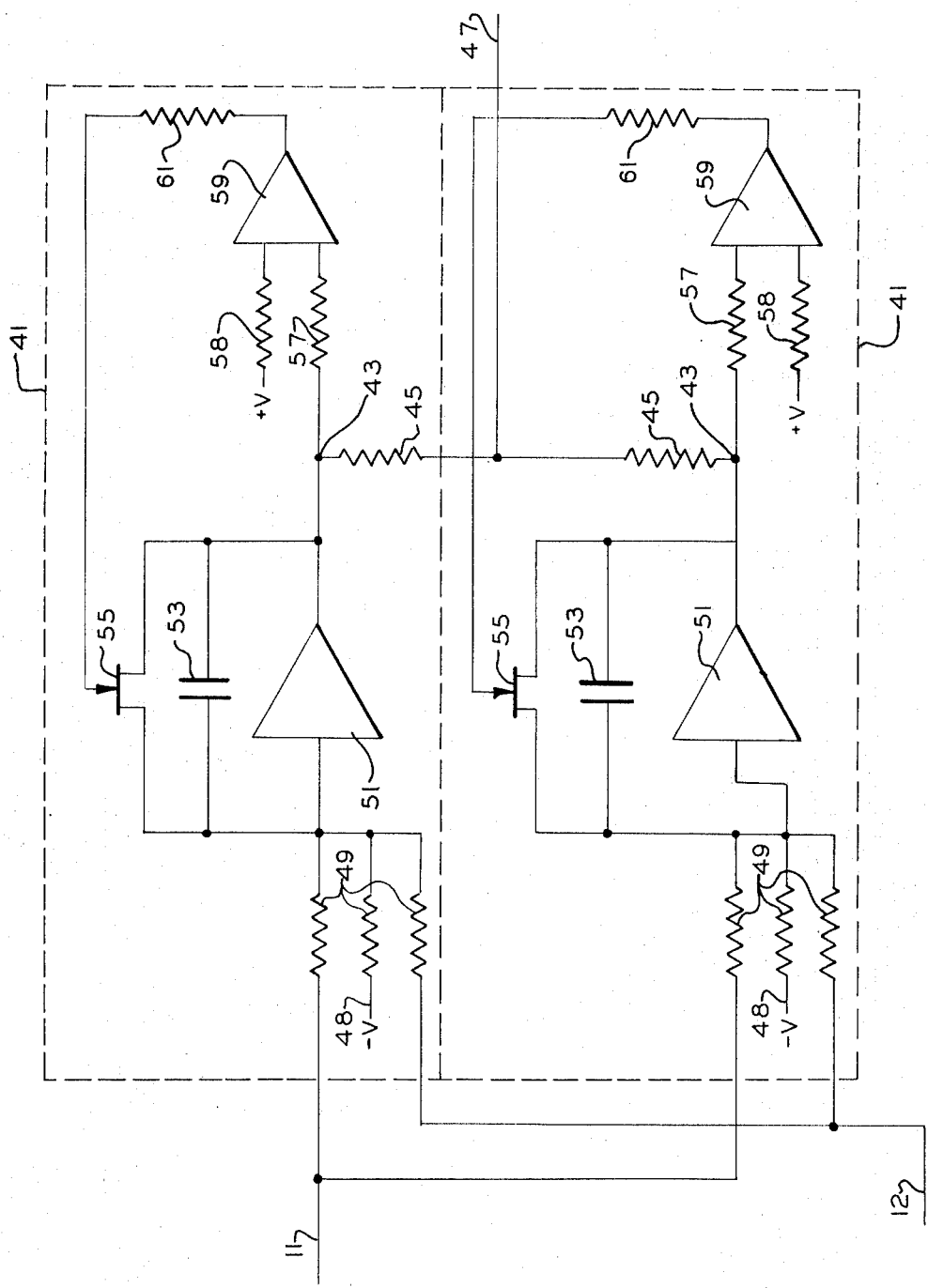
FIG. 2 is a schematic diagram of an embodiment of the whine generator of FIG. 1.

FIG. 2 shows in detail the circuits in whine generator 13. The whine in a jet engine will contain a basic frequency dependent on RPM, and harmonics. The circuits shown comprise two voltage controlled oscillators 41, indicated in FIG. 2 by dotted lines. Both are nominally the same, common reference numerals being used to indicate identical components in each circuit, but because of the component tolerances of the non-precision components used they will have slightly different frequencies. The use of non-precision components in this case means that no attempt is made to match the resistors, capacitors, transistors etc. Off the shelf components are used including standard resistors having 5 or 10 percent tolerances. By summing the two oscillator outputs 43 through resistors 45 to obtain a final output 47, a signal containing all the desired harmonics is obtained.

Each of the oscillators has three inputs, the RPM input 11, a negative voltage input 48, and an input 12 from the engine fired circuit 17 shown on FIG. 1. These inputs are summed through input resistors 49 at amplifier 51, a solid state micro circuit amplifier such as that manufactured and sold under the trade designation LM201 by National Semiconductor Corporation of Santa Clara, California. In the feed back loop of amplifier 51 is a capacitor 53 and a field effect transistor 55 such as a 2N4302. Having a capacitor in such a circuit provides an integrator, as is well known in the art. the output of amplifier 51, which is also the oscillator output 43, serves as an input, through summing resistor 57, to the non-inventing input of amplifier 59 which is the same type as amplifier 51. The inverting input of amplifier 59 has a positive voltage applied, as indicated, through summing resistor 58. The output of amplifier 59 is fed through resistor 61 to the gate of transistor 55.

With the engine stopped and not fired input 11 will have zero volts on it, and input 12 will have a positive voltage which will overcome the negative voltage input 48. The output of amplifier 51 will then be negative and because of the integrating nature of the circuit will tend to reach negative saturation. This negative voltage is an input to the non-inverting input of amplifier 59 which will then have a negative output since its non inverting input has a negative voltage on it and its inverting input a positive voltage. Since transistor 55 will be an open circuit with a negative voltage on it the circuit will remain stable.

As RPM is increased a proportionally increasing voltage will be placed on input 11. When the sum of voltages at the input to amplifier 51 becomes negative, the amplifier output will become positive and capacitor 53 will begin to charge with positive voltage. The input to the non-inverting input of amplifier 59 is now beginning to balance the input on the inverting input. When it exceeds the positive voltage on the inverting input a positive output from amplifier 59 will result. This output will turn on transistor 55, shorting out capacitor 53 and dropping the output of amplifier 51. As soon as the voltage drops transistor 55 will open again and the process will repeat. The greater the RPM, and thus the higher the voltage on input 11, the higher the frequency will be. When the engine fires and the voltage on input 12 becomes negative the summed voltage will become much more negative and a marked increase in frequency will occur. The combination of these effects will produce a sound simulating that of the actual jet engine whine.

FIG. 3 shows a circuit diagram for roar generator 15. White noise is input to a low pass filter circuit 63 comprising an amplifier 65 and associated resistors 67 and capacitors 69. Such filters are well known in the art and design information is available from any amplifier manufacturer. The output of filter 63 will be a signal containing low frequency components such as those found in engine roar noise. This output, after passing through output resistor 71, is the output of the roar circuit. However, it is also connected to a shunt circuit comprising field effect transistor 72, and its input resistor 73. The gate of transistor 72 is controlled by a signal obtained by summing a voltage proportional to mach number from input 21 and one proportional to RPM from input 11, each having an appropriate input resistor 75. As RPM increases the voltage on input 11 becomes more negative tending to open transistor 72 and allow all of the output to get out. If the aircraft is standing still on the ground (mach number is zero) no balancing input is present on input 21. But as the aircraft gains speed an increasing positive voltage will appear on input 21 tending to cause transistor 72 to shunt the output to ground. Scaling is such that, when the speed of the aircraft reaches a speed where roar is no longer audible, all of the output will be shunted to ground.

FIG. 4 is a circuit diagram of the attenuator 25 shown on FIG. 1. It is basically a series of shunts employing field effect transistors in the same manner as the shunt in the roar circuit of FIG. 3. Line 81 is the input from amplifier 23 on FIG. 1 which carries a signal obtained by summing whine and roar. In the first section of the attenuator, comprising transistors 83 and resistors 85, a portion of the signal is shunted to ground if the engine is not fired and the turbine speed is below 11 percent of maximum RPM. The engine is normally fired at 11 percent. Thus, having both shunts assures that the noise will be greatly attenuated when the engine is not fired. The output of this section also is connected to another shunt transistor 87 through input resistor 89 where the signal is further shunted to ground if the engine is not fired. Once the engine is fired and turbine speed is over 11 percent, the inputs to transistors 85 and 87 will become negative thus causing them to become open circuits and the full signal will pass to point 91, the input to the second section of the attenuator.

Here, a similar circuit comprising transistors 93 and resistors 95 will shunt a portion of the signal to ground depending on the instructor's volume control and the altitude. The input 97 from instructor's volume control will place a voltage proportional to desired volume on its associated transistor 93, thus controlling volume by shunting more or less of the signal to ground. The input 99 from the altitude function will have a voltage which becomes more positive as altitude increases, thus reducing the sound level as altitude increases by shunting a greater portion of the signal to ground. The final output appears at point 101 from which it is taken through summing resistor 103 to power amplifier 29 on FIG. 1.

The air noise generated by the circuit shown on FIG. 5 is basically white noise with its volume controlled by aircraft velocity ($V_p$). The input 111 to air noise generator 33 is placed, after passing through input resistor 113, on the source of a field effect transistor 115 which has its drain grounded. The input 117 to the gate of transistor 115 is obtained by summing, through resistors 119, a bias voltage and a voltages proportional to the aircraft velocity. Scaling is arranged so that increasing amounts of input 111 will be grounded as velocity decreases.

From the above description it is evident that the invention shows a new and simple sound system for simulating the sounds of jet engines. By the novel manner in which two voltage controlled oscillators have been employed and the ingenious application of field effect transistors to control the amplitude of the sounds, a system closly simulating the sounds of a jet turbine has been disclosed.

Although a preferred embodiment for application in a small aircraft simulator has been disclosed it is not the intention of the inventor to limit his invention to that embodiment. The invention may be applied to other types of simulators where turbine noise is present. It is also obvious that the invention may be practiced using different types of oscillator and shunts.

What is claimed is:

1. Apparatus to simulate the whine of a jet engine comprising:
   a. a pair of nominally identical voltage controlled sawtooth oscillators constructed using non-precision components, said oscillators having a common voltage control input and a common output, said common control input of said oscillators having as a first input a voltage proportional to the RPM of the engine being simulated;
   b. means to provide as a second input to said common control input a voltage dependent on the engine being fired, said voltage being of a first polarity when said engine is not fired and of a second polarity when said engine is fired;
   c. an amplifier having an input connected to the output of said pair of oscillators; and
   d. a speaker connected to the output of said amplifier whereby a basic frequency and harmonics sounding like the whine of a jet engine will be produced, amplified, and broadcast.

2. Apparatus according to claim 1 further including a roar generator connected to said amplifier.

3. Apparatus according to claim 2 wherein said roar generator comprises:
   a. a white noise generator;
   b. filter means connected to said white noise generator to cause the output of said roar generator to contain only frequencies found in the roar noise of a jet engine;
   c. voltage attenuator means having as attenuating inputs a voltage of first polarity proportional to engine RPM and a voltage of opposite polarity proportional to mach number.

4. Apparatus according to claim 3 wherein said attenuator means comprises a field effect transistor having its source connected to said roar generator output, its drain to ground and having on its gate the summation of voltages representing RPM and mach number and wherein the RPM voltage will tend to keep said transistor off and the mach number will tend to turn said transistor on.

5. Apparatus according to claim 2 and further including voltage controlled attenuation means having said amplifier output as an input and providing its output to said speakers.

6. Apparatus according to claim 5 wherein said attenuator means comprise field effect transistors having their sources connected to said amplifier output, their drains connected to ground and their gates to signals representing parameters effecting the sound heard by a listener whereby when the audible sound decreases said signals will cause increasing portions of the sound to be shunted to ground.

7. Apparatus according to claim 6 wherein the signals applied to said attenuators comprise signals representing the turbine speed, an indication that the engine is fired, altitude of the engine, and a manually controlled volume control.

* * * * *